US010110020B2

(12) United States Patent
Kawamoto et al.

(10) Patent No.: US 10,110,020 B2
(45) Date of Patent: Oct. 23, 2018

(54) EQUALIZATION DEVICE FOR ASSEMBLED BATTERY

(71) Applicant: DENSO CORPORATION, Kariya, Aichi-pref. (JP)

(72) Inventors: Teppei Kawamoto, Anjo (JP); Nobuyoshi Osamura, Nishio (JP); Ryotaro Miura, Nagoya (JP); Tomomichi Mizoguchi, Inazawa (JP)

(73) Assignee: DENSO CORPORATION, Kariya (JP)

( * ) Notice: Subject to any disclaimer, the term of this patent is extended or adjusted under 35 U.S.C. 154(b) by 527 days.

(21) Appl. No.: 14/445,475

(22) Filed: Jul. 29, 2014

(65) Prior Publication Data

US 2015/0035487 A1 Feb. 5, 2015

(30) Foreign Application Priority Data

Aug. 2, 2013 (JP) ................................. 2013-161345

(51) Int. Cl.
*H02J 7/00* (2006.01)
(52) U.S. Cl.
CPC ......... *H02J 7/0016* (2013.01); *Y02T 10/7055* (2013.01)
(58) Field of Classification Search
CPC .............................. H02J 7/0014; H02J 7/0042
USPC ........ 320/112, 116, 117, 118, 119, 120, 121, 320/122, 123, 124, 125, 126, 127
See application file for complete search history.

(56) References Cited

U.S. PATENT DOCUMENTS

| 2003/0044689 A1 | 3/2003 | Miyazaki et al. |
| 2005/0242775 A1 | 11/2005 | Miyazaki et al. |
| 2005/0269990 A1* | 12/2005 | Yudahira ............... H02J 7/0019 320/119 |

(Continued)

FOREIGN PATENT DOCUMENTS

| JP | 2004-248348 A | 9/2004 |
| JP | 2009-159768 A | 7/2009 |

(Continued)

OTHER PUBLICATIONS

Office Action dated Aug. 4, 2015 in the corresponding JP application No. 2013-161345 (With English translation).

*Primary Examiner* — Drew A Dunn
*Assistant Examiner* — Harry O'Neil-Becerril
(74) *Attorney, Agent, or Firm* — Posz Law Group, PLC

(57) ABSTRACT

An equalization device for equalizing voltages of battery cells connected in series includes equalization switches, resistors, and a control circuit. Each equalization switch has energization terminals interposed between terminals of a corresponding battery cell. A current path between the energization terminals conducts when a control voltage not less than a threshold voltage is applied between control terminals of the equalization switch. Each resistor is connected between the control terminals of the corresponding equalization switch. The control circuit switches an equalization execution state and an equalization stop state in accordance with an equalization signal provided for each battery cell. In the execution state, the control circuit passes an electric current through the corresponding resistor to generate the control voltage not less than the threshold voltage. In the stop state, the control circuit causes the corresponding resistor to generate the control voltage less than the threshold voltage.

9 Claims, 7 Drawing Sheets

(56) References Cited

U.S. PATENT DOCUMENTS

| | | | |
|---|---|---|---|
| 2012/0086401 A1* | 4/2012 | Laber | H02J 7/0016 320/118 |
| 2012/0126859 A1* | 5/2012 | Kawamoto | H03K 17/163 327/108 |
| 2013/0069597 A1* | 3/2013 | Sugimura | H02J 7/00 320/118 |
| 2013/0162213 A1* | 6/2013 | Izawa | H02J 7/0016 320/118 |
| 2016/0069962 A1* | 3/2016 | Miura | H02J 7/0021 307/43 |

FOREIGN PATENT DOCUMENTS

| | | |
|---|---|---|
| JP | 2010-032412 A | 2/2010 |
| JP | 2010-273412 A | 12/2010 |
| JP | 2011-250609 A | 12/2011 |

\* cited by examiner

FIG. 3

| | NORMAL MODE | EQUALIZATION MODE | STANDBY MODE (DARK CURRENT MODE) |
|---|---|---|---|
| VEHICLE SYSTEM | | | |
| EQUALIZATION DEVICE | EQUALIZATION STOP | EQUALIZATION EXECUTION | EQUALIZATION STOP |
| PS SIGNAL | PS ON | PS ON | PS OFF |
| ENABLE SIGNAL | EQUALIZATION DISABLED | EQUALIZATION ENABLED | EQUALIZATION DISABLED |
| EQUALIZATION SIGNAL | OFF | ON (INDICATE CELL TO BE DISCHARGED AND DISCHARGE TIME) | OFF |
| DRIVE SIGNAL | ON | OFF | UNDEFINED |
| CONTROL SIGNAL | OFF | ON FOR CELL TO BE DISCHARGED ONLY DURING DISCHARGE TIME | UNDEFINED |
| EQUALIZATION SW | OFF | ON (CELL TO BE DISCHARGED) OFF (CELL NOT TO BE DISCHARGED) | OFF |

EQUALIZATION DEVICE FOR ASSEMBLED BATTERY

CROSS REFERENCE TO RELATED APPLICATION

This application is based on Japanese Patent Application No. 2013-181345 filed on Aug. 2, 2013, the contents of which are incorporated herein by reference.

TECHNICAL FIELD

The present disclosure relates to an equalization device for an assembled battery including multiple battery cells connected in series.

BACKGROUND

A battery, which is mounted on a motor-operated vehicle such as an electric vehicle (EV) or a hybrid vehicle (HV) to supply electric power to a motor of the vehicle, needs a high voltage of, for example, about 300V. For this reason, the battery is configured as an assembled battery including multiple battery cells, each of which has a cell voltage of a few volts, connected in series. A lithium ion battery cell, which has been widely used in recent years, has a high cell voltage. Therefore, when the assembled battery is constructed with the lithium ion battery cells, the total number of battery cells in the assembled battery can be reduced, so that the size of the assembled battery can be reduced.

However, if each battery cell is not used within a predetermined cell voltage range between its minimum effective voltage and its maximum effective voltage, troubles such as a significant reduction in capacity of the battery cell and abnormal heat generation in the battery cell may occur. Further, if the battery cells have different cell voltages due to variations in their capacity, an error of a voltage of the assembled battery with respect to its target voltage may become large. For this reason, an equalization device for monitoring voltages of battery cells and equalizing the voltages has been demanded.

JP-A-2012-23848 corresponding to US 2013/0162213 discloses an equalization device having an equalization switch provided for each battery cell.

In addition to the equalization switches, the conventional equalization device has a level shift circuit which is provided for each equalization switch and operates on a power supply voltage produced by voltages of adjacent multiple battery cells. The level shift circuits are accumulated from a low potential side to a high potential side. The equalization device applies a drive voltage, which is level-shifted to the high potential side, between control voltages of the equalization switch in accordance with an equalization signal inputted with respect to a ground potential, for example.

In the conventional equalization device, if a connector connecting the equalization device and the assembled battery is disconnected, or if a power supply voltage or a ground potential of a control circuit, which receives the equalization signal and supplies the equalization signal to the level shift circuit, is lost, an operation of the level shift circuit becomes undefined, i.e., the drive voltage becomes undefined. As a result, an operation of the equalization becomes undefined.

SUMMARY

In view of the above, it is an object of the present disclosure to provide a an assembled battery equalization device capable of stably keeping an equalization switch OFF even when a potential is undefined or a power supply voltage is lost in a control circuit which controls the equalization switch.

According to an aspect of the present disclosure, an equalization device is used for equalizing cell voltages of n battery cells of an assembled battery, where n is a positive integer. The battery cells are connected in series in such a manner that a first terminal of the (k+1)th battery cell is connected to a second terminal of the kth battery cell, where k is a positive integer less than n. The equalization device includes equalization switches, resistors, and a control circuit. Each equalization switch is provided for a corresponding one of the battery cells. Each equalization switch has energization terminals, control terminals, and a threshold voltage. A current path between the energization terminals is interposed between the first terminal and the second terminal of the corresponding battery cell. The current path conducts when a control voltage not less than the threshold voltage is applied between the control terminals. Each resistor is connected between the control terminals of a corresponding one of the equalization switches. The control circuit switches an equalization execution state and an equalization stop state in accordance with an equalization signal provided for each battery cell. In the equalization execution state, the control circuit generates the control voltage not less than the threshold voltage by passing an electric current through the resistor provided for the battery cell corresponding to the equalization signal. In the equalization stop state, the control circuit causes the resistor provided for the battery cell corresponding to the equalization signal to generate the control voltage less than the threshold voltage.

BRIEF DESCRIPTION OF THE DRAWINGS

The above and other objects, features and advantages of the present disclosure will become more apparent from the following detailed description made with reference to the accompanying drawings. In the drawings:

FIG. 3 is a state transition diagram of the equalization device;

DETAILED DESCRIPTION

Embodiments of the present disclosure are described below with reference to the drawings in which the same or similar number refers to the same or similar part.

First Embodiment

Figure 1:
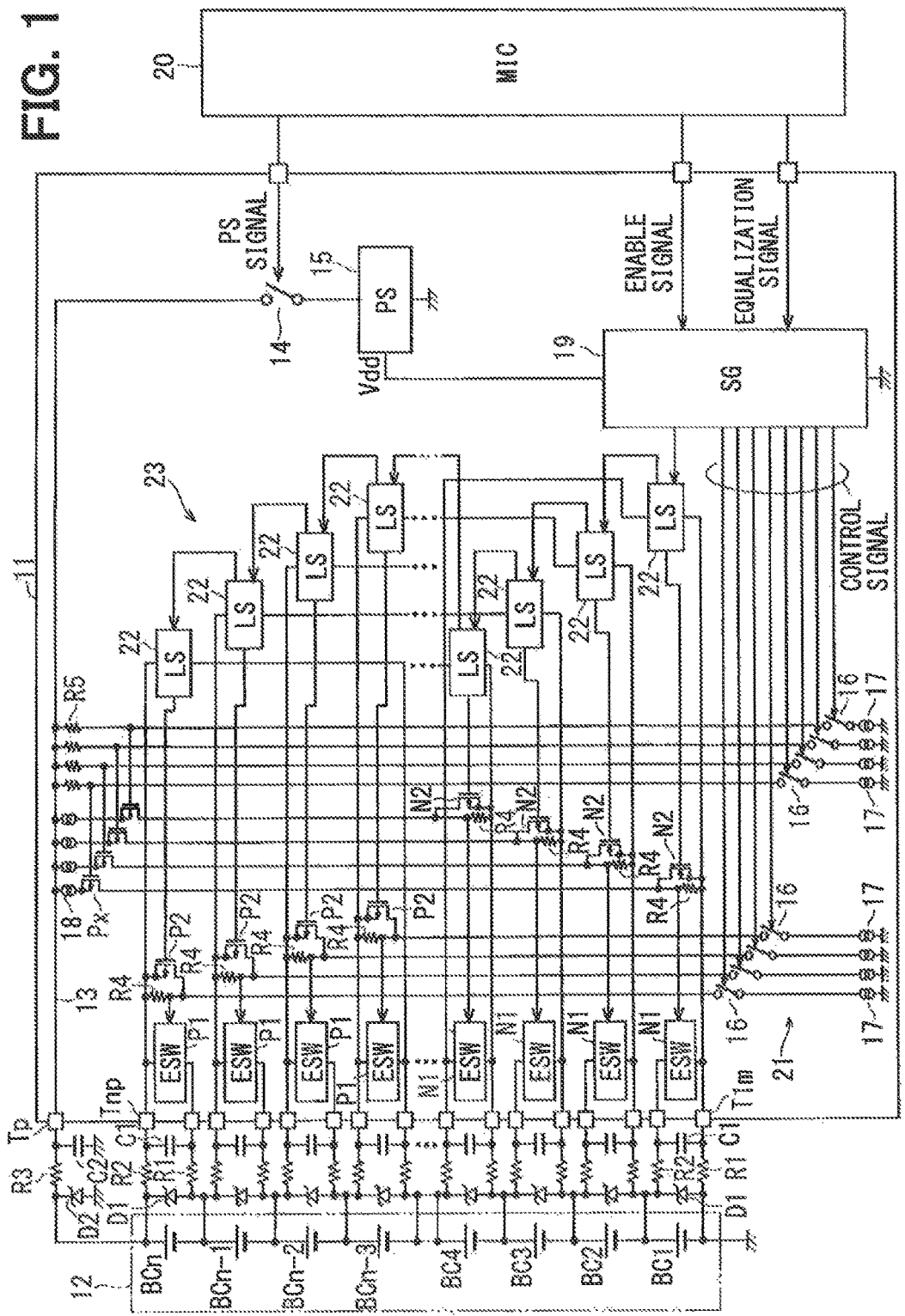
FIG. 1 is a schematic of an equalization system including equalization device according to a first embodiment of the present disclosure.
Figure 2:
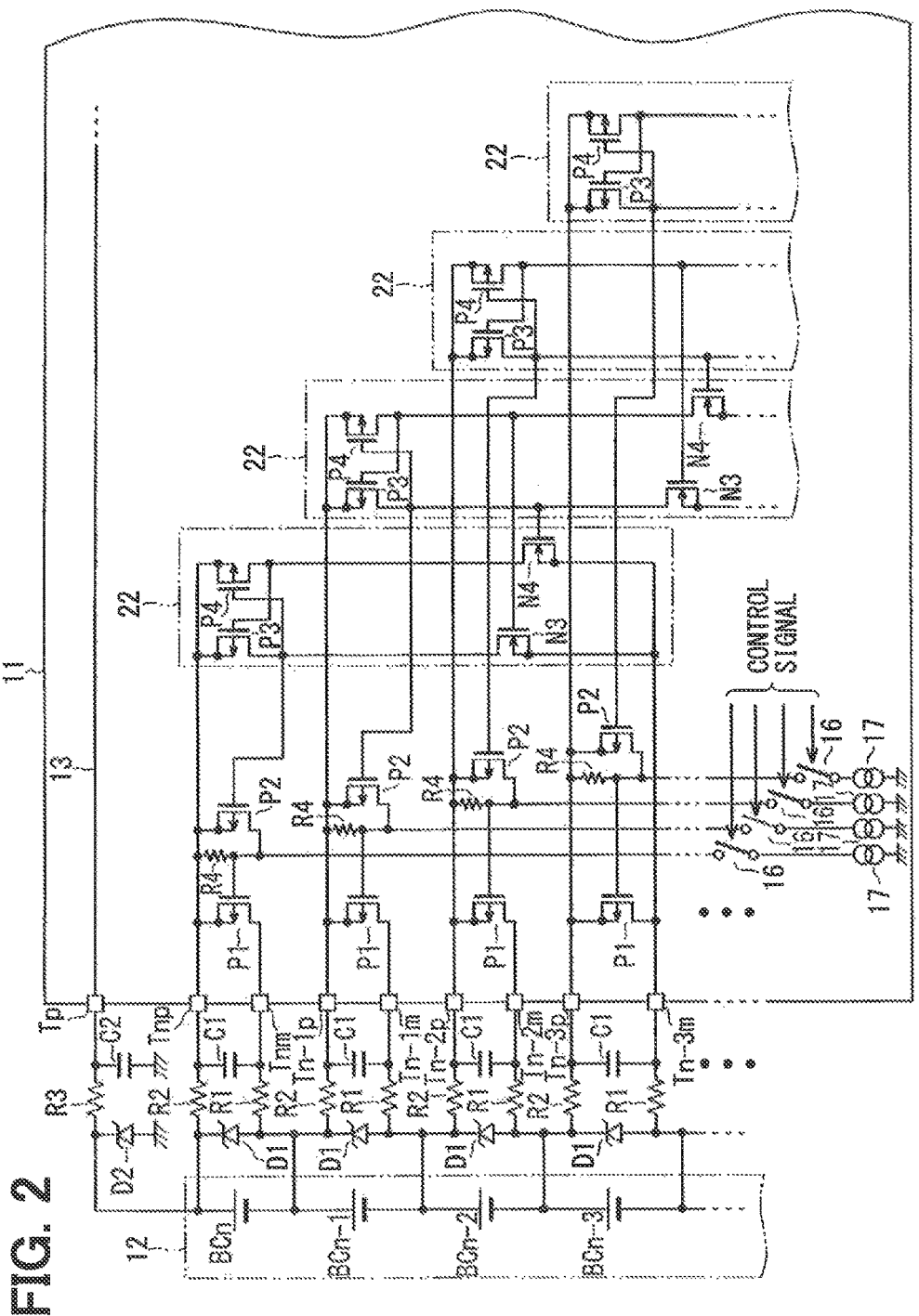
FIG. 2 is a partial detailed view of the equalization device.

A first embodiment of the present disclosure is described with reference to FIGS. 1 to 4. An integrated circuit (IC) 11 shown in FIGS. 1 and 2 is an equalization device for equalizing voltages of n battery cells BC1 to BCn of an assembled battery 12, where n is a positive integer. The assembled battery 12 is mounted on a motor-operated vehicle, which has a motor and is capable of running by the motor, such as an electric vehicle (EV) or a hybrid vehicle (HV). The assembled battery 12 supplies electric power to the motor.

In the assembled battery 12, the battery cells BC1 to BCn are connected in series in such a manner that a positive terminal (as a second terminal) of the kth battery cell BCk (k=1, ..., n-1) is connected to a negative terminal (as a first terminal) of the (k+1)th battery cell BCk+1. For example, according to the first embodiment, the assembled battery 12 has eighty lithium secondary battery cells (i.e., n=80) connected in series, and each lithium secondary battery cell has a cell voltage of 3.6V.

As shown in FIGS. 1 and 2, a Zener diode D1 is connected between the positive and negative terminals of the battery cell BCi (i=1, ..., n). The negative terminal of the battery cell BCi is connected through a resistor R1 to a terminal Tim of the IC11. The positive terminal of the battery cell BCi is connected through a resistor R2 to a terminal Tip of the IC11. A capacitor C1 is connected between the terminals Tim and Tip. When the voltages are equalized, the resistors R1 and R2 work to limit a discharge current and also work together with the capacitor C1 as a filter circuit.

The negative terminal of the battery cell BC1 is connected to a reference potential. For example according to the first embodiment, the reference potential is a ground potential. A Zener diode D2 is connected between the positive terminal of the battery cell BCn and the ground potential. The positive terminal of the battery cell BCn is connected through a resistor R3 to a power supply terminal Tp of the IC 11. A capacitor C2 is connected between the power supply terminal Tp and the ground potential. The resistor R3 and the capacitor C2 work together as a filter circuit. Inside the IC 11, the power supply terminal Tp is connected to a power supply circuit (denoted as "PS" in FIG. 1) 15 through a power supply line 13 and a switch 14. The power supply circuit 15 produces a power supply voltage Vdd.

The IC 11 has an equalization switch (denoted as "ESW" in FIG. 1) provided for each of the battery cells BC1 to BCn. The equalization switch provided for each of a half of the battery cells BC1 to BCn is an N-channel MOS transistor, and the equalization switch provided for each of the remaining half of the battery cells BC1 to BCn is a P-channel MOS transistor. Specifically, each of the battery cells BC1 to BCn/2 located on the low potential side is provided with an N-channel MOS transistor N1 as the equalization switch, and each of the battery cells BCn/2+1 to BCn located on the high potential side is provided with a P-channel MOS transistor P1 as the equalization switch. The drain and source of the transistor N1, P1 corresponds to energization terminals, and the gate and source of the transistor N1, P1 correspond to control terminals. As shown in FIGS. 1 and 2, a current path between the energization terminals of the transistor N1, P is interposed between the positive and negative terminals of the corresponding battery cell. As described in detail later, the current path conducts when a control voltage not less than a threshold voltage of the transistor N1, P is applied between the control terminals of the transistor N1, P1.

A resistor R4 is connected between the gate and the source of the transistor N1, P1. A series circuit of a switch circuit 16 and a constant current circuit 17 is connected between the gate of the transistor P1 and the ground potential. Likewise, the transistor N1 is provided with a series circuit of the switch circuit 16 and the constant current circuit 17. In the case of the transistor N1, in order to cause an output current of the constant current circuit 17 to turn at the power supply line 13 and to flow through the resistor R4, a resistor R5 is connected between the power supply line 13 and the switch circuit 16, and a constant current circuit 18 and a P-channel MOS transistor Px are connected between the power supply line 13 and the gate of the transistor N1. Alternatively, a current mirror circuit can be used in order to cause the output current of the constant current circuit 17 to turn.

A signal generation circuit 19 (denoted as "SG" in FIG. 1) receives an enable signal and an equalization signal from a microcomputer (denoted as "MIC" in FIG. 1) 20 which is located outside the IC 11. The enable signal indicates whether an equalization process is enabled or disabled. The equalization signal indicates which battery cell BCi is to be discharged and also indicates a discharge time during which the indicated battery cell BCi is to be discharged. During a period of time where the signal generation circuit 19 is supplied with the power supply voltage Vdd from the power supply circuit 15, the signal generation circuit 19 outputs a current control signal to each switch circuit 16 based on the enable signal and the equalization signal, thereby executing the equalization process to equalize the voltages of the battery cells BC1 to BCn of the assembled battery 12.

The switch circuit 16, the constant current circuit 17, and the signal generation circuit 19 form a control circuit 21. When the current control signal is at an ON level (e.g., high level), the switch circuit 16 is turned ON, and when the current control signal is at an OFF level (e.g., low level), the switch circuit 16 is turned OFF. When the switch circuit 16 is turned ON by the current control signal of the ON level, an electric current flows through the resistor R4 so that the corresponding transistor N1 or P1 provided for the battery cell BCi can be turned ON. The IC 11 and the microcomputer 20 form an electronic control unit (ECU) for monitoring the assembled battery 12.

The resistor R4 is connected between the drain and the source of an N-channel MOS transistor N2 in addition to between the gate and the source of the transistor N1. Likewise, the resistor R4 is connected between the drain and the source of a P-channel MOS transistor P2 in addition to between the gate and the source of the transistor P1. The transistor N2, P2 is driven by a drive voltage outputted by a level shift circuit (denoted as "LS") 22. The level shift circuit 22 is provided for each battery cell BCi and forms a drive circuit 23.

Each level shift circuit 22 operates on a power supply voltage produced by a series circuit of adjacent four battery cells including the battery cell BCi. For example, the level shift circuit 22 provided for the battery cell BCn operates on cell voltages of four battery cells BCn-3, BCn-2, BCn-1, and BCn, and the level shift circuit 22 provided for the battery cell BC1 operates on cell voltages of four battery cells BC1, BC2, BC3, and BC4.

Each level shift circuit 22 has a so-called cross-latch configuration. For example, as shown in FIG. 2, a series circuit of a P-channel MOS transistor P3 and an N-channel MOS transistor N3 is connected in parallel to a series circuit of a P-channel MOS transistor P4 and an N-channel MOS transistor N4 between a terminal Tnp and a terminal Tn-3m of the IC 11. The gate of the transistor P3 is connected to the drain of the transistor P4, and the gate of the transistor P4 is connected to the drain of the transistor P3.

The drains of the transistors P3 and N3 are connected together to the gate of the transistor P2 provided for the battery cell BCn to supply the drive voltage. The drains of the transistors P4 and N4 are connected together, and an inverted voltage of the drive voltage appears at the drains of the transistors P4 and N4. The drive voltage outputted by the level shift circuit 22 provided for the battery cell BCn-1 adjacent to the battery cell BCn on the low potential side is supplied as a drive signal to the gate of the transistor N4. The inverted voltage of the drive voltage outputted by the level shift circuit 22 provided for the battery cell BCn-1 is supplied to the gate of the transistor N3.

The level shift circuits 22 provided for the battery cells BCn-1, BCn-2, BC2 are configured in the same manner as described above for the level shift circuit 22 provided for the battery cell BCn. Thus, when the signal generation circuit 19 outputs an ON-drive signal to the level shift circuit 22 provided for the battery cell BC1, the ON-drive signal propagates to the adjacent level shift circuit 22 in sequence, so that all the transistors N2 and the P2 are turned ON at once. In contrast, when the signal generation circuit 19 outputs an OFF-drive signal to the level shift circuit 22 provided for the battery cell BC1, the OFF-drive signal propagates to the adjacent level shift circuit 22 in sequence, so that all the transistors N2 and the P2 are turned OFF at once.

Figure 4:
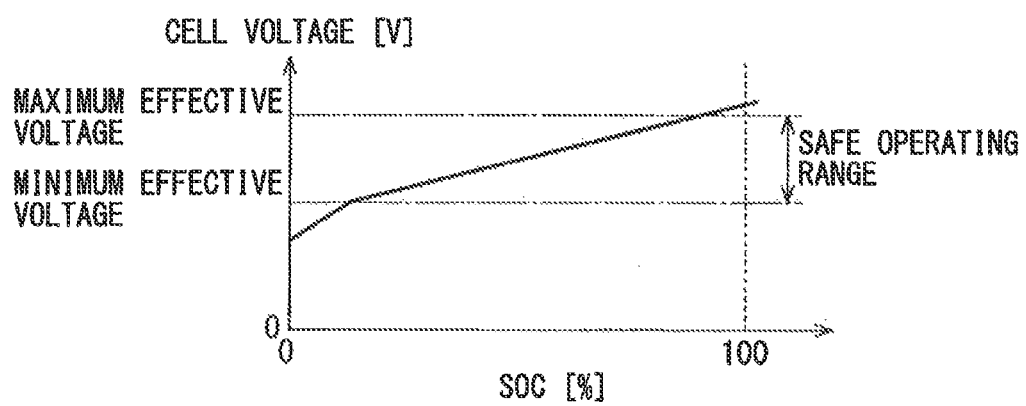
FIG. 4 is a characteristic diagram of a lithium secondary battery cell.

Next, operations of the first embodiment are described below with further reference to FIGS. 3 and 4. The microcomputer 20 executes the equalization process for the assembled battery 12 at the right timing according to a state of a vehicle system. As shown in FIG. 3, when the vehicle system is in a normal mode or in an equalization mode, the microcomputer 20 keeps a power supply (PS) signal at an ON level. The normal mode is a mode where an ignition (IG) switch of the vehicle is ON so that the assembled battery 12 can supply electric power to the motor of the vehicle. The equalization mode is a mode immediately after the IG switch is turned OFF. When the PS signal is at the ON level, the switch 14 of the IC 11 is turned ON so that the power supply voltage Vdd can be generated. Thus, the internal circuitry of the IC 11 becomes operable. When the equalization mode ends, the vehicle system switches to a standby mode (i.e., dark-current mode) to save power consumption of the assembled battery 12. When the vehicle system is in the standby mode, the microcomputer 20 keeps the PS signal at an OFF level. When the PS signal is at the OFF level, the switch 14 of the IC 11 is turned OFF so that the power supply voltage Vdd can be lost.

In the normal mode and the standby mode, the enable signal transmitted from the microcomputer 20 to the IC 11 indicates that the equalization process is disabled. At this time, the equalization signal transmitted from the microcomputer 20 to the IC 11 indicates no battery cell to be discharged as denoted as "OFF" in FIG. 3. Thus, the IC 11 stops the equalization process in the normal mode and the standby mode. That is, in the normal mode and the standby mode, the IC 11 as the equalization device is in an equalization stop state.

In the normal mode, the signal generation circuit 19 outputs the current control signal of the OFF level to the switch circuit 16 of each of all the battery cells BC1 to BCn based on the enable signal. Thus, the switch circuit 16 is turned OFF so that the output current of the constant current circuit 17 cannot flow through the resistor R4. At this time, since the gate-to-source voltage of the transistor N1, P1, as a control voltage of the equalization switch, becomes less than a threshold voltage Vth of the transistor N1, P1, the transistor N1, P1 is turned OFF. Thus, the resistor R4 can have a function to keep the equalization switch OFF.

Further, in the normal mode, the signal generation circuit 19 outputs the ON-drive signal. At this time, the level shift circuit 22 of the drive circuit 23 applies an ON-drive voltage between the gate and source of the transistor N2, P2. Thus, the transistors N2, P2 are turned ON at once so that impedance between the gate and the source of the transistor N1, P1 can be reduced. Therefore, even when noise enters the IC 11, the gate-to-source voltage of the transistor N1, P1 remains less than the threshold voltage Vth so that the transistor N1, P1 can be prevented from being accidentally turned ON.

In contrast, when the PS signal changes to the OFF level in the standby mode, the power supply voltage Vdd of the IC 11 is lost, so that the IC11 becomes undefined. That is, the level of the current control signal outputted to the switch circuit 16 becomes undefined, and the level of the drive signal outputted to the level shift circuit 22 becomes undefined. Since the power supply voltage Vdd is lost, the current control signal is not kept at the ON level. As a result, the constant current circuit 17 stops outputting the current, and no current flows through the resistor R4. Thus, the resistor R4 clamps the potential of the transistor N1, P1 to its source potential, so that the transistor N1, P1 is kept OFF.

When the drive signal becomes undefined, the operation of the level shift circuit 22 becomes undefined accordingly. However, although the transistor N2, P2 which is OFF do not influence the equalization process, the transistor N2, P2 which is ON can have a function to keep the transistor N1, P1 OFF. That is, the drive circuit 23 and the transistor N2, P2 have a function to turn OFF the transistor N1, P1, but do not have a function to turn ON the transistor N1, P1. Therefore, in the standby mode, the transistor N1, P1 stably remain OFF so that the IC 11 can stably remain in the equalization stop state.

Although not shown in the drawings, the IC 11 detects the cell voltages of the battery cells BC1 to BCn and transmits detection values indicative of the detected cell voltages to the microcomputer 20. The microcomputer 20 monitors based on the received detection values whether the cell voltages are equal to each other and fall within a predetermined voltage range (as a safe operation range). The microcomputer 20 identifies at least one battery cell whose cell voltage is higher than those of the other battery cells and needs to be equalized to those of the other battery cells. Further, the microcomputer 20 determines a discharge time during which the identified battery cell needs to be discharged in order to equalize the cell voltage of the identified battery cell to those of the other battery cells. If the microcomputer 20 identifies multiple battery cells whose cell voltages are higher than those of the other battery cells, the microcomputer 20 determines the discharge time for each of the identified battery cells individually.

In the equalization mode, the microcomputer 20 transmits to the IC 11 the enable signal indicating that the equalization process is enabled and the equalization signal indicating the identified battery cell to be discharged and the discharge time during which the identified battery cell BCi is to be discharged. The signal generation circuit 19 executes the equalization process based on the equalization signal. Thus, the IC 11 is in an equalization execution state. Regarding a state of charge (SOC) and a cell voltage, a lithium secondary battery cell has characteristics shown in FIG. 4. In order to safely use the lithium secondary battery cell while increasing its life, it is necessary to control the charge and discharge of the lithium secondary battery cell so that a cell voltage of the lithium secondary battery cell can fall within a safe operation range between its minimum effective voltage and its maximum effective voltage. The microcomputer 20 generates the equalization signal so that the cell voltage of the battery cell BCi can fall within the safe operation range.

The signal generation circuit 19 outputs the OFF-drive signal so that the transistors N2 and the P2 provided for the battery cells BC1 to BCn can be turned OFF at once. The signal generation circuit 19 outputs the current control signal of the ON level to the switch circuit 16 provided for the battery cell to be discharged while outputting the current control signal of the OFF level to the switch circuit 16 provided for the battery cell not to be discharged.

The output current of the constant current circuit 17 flows through the resistor R4 when the switch circuit 16 is turned ON. At this time, the gate-to-source voltage of the transistor N1, P1, as a control voltage of the equalization switch, increases to not less than the threshold voltage Vth of the transistor N1, P1. Thus, the transistors N1, P1 provided for the battery cell to be discharged are turned ON at once. As a result, a charge current flows from the battery cell to be discharged through the resistor R2, the transistor N1 or P1, and the resistor R1. Accordingly, the capacity of the battery cell to be discharged decreases, and the cell voltage of the battery cell to be discharged decreases. The signal generation circuit 19 outputs the current control signal of the OFF level to the switch circuit 16 provided for the battery cell to be discharged when the individual discharge time elapses.

As described above, according to the first embodiment, the IC 11 as the equalization device executes the equalization process for the assembled battery 12 by means of a discharging control whenever the IG switch of the vehicle is turned OFF. Thus, it is possible to prevent a significant reduction in capacity of the assembled battery 12, abnormal heat generation in the assembled battery 12, and an error of an output voltage of the assembled battery 12 with respect to its target voltage. Further, when the assembled battery 12 is charged, the IC 11 can execute the equalization process for the assembled battery 12 by means of a charging control by turning ON the equalization switch provided for the battery cell which do not need to be charged.

The transistor N1, P1 as the equalization switch is turned ON when its gate voltage (as a control voltage) generated by the current flowing through the resistor R4 increases to not less than the threshold voltage Vth. Thus, the transistors N1, N2 can be stably kept OFF under conditions where no current flows through the resistor R4, for example, when a connector connecting the IC11 and the assembled battery 12 is disconnected, when the vehicle system changes to the standby mode so that the power supply voltage Vdd of the IC 11 can be interrupted, etc.

In a conventional configuration where a control voltage of an equalization switch is generated by level-shifting, the number of accumulation of level shift circuits is larger as a battery cell is on a higher potential side. As a result, a large layout size is required. In contrast, according to the first embodiment, the control circuit 21 for generating the control voltage of the equalization switch by passing the current through the resistor R4 is constructed with a series circuit of the switch circuit 16 and the constant current circuit 17. In such an approach, the number of elements is reduced, and accordingly the layout size is reduced.

The transistor N2, P2 is connected between the gate and source of the transistor N1, P1. When the transistor N2, P2 is turned ON by the ON-drive voltage, the impedance between the gate and source of the transistor N1, P1 is reduced. Thus, noise immunity is improved, so that a malfunction can be prevented. The transistors N2, P2 do not have the function to turn ON the equalization switches.

Therefore, even when the disconnection of the connector or the interruption of the power supply voltage Vdd occurs, it is ensured that the transistors N1, P1 are kept OFF.

The level shift circuit 22 is provided for each of the battery cells BC1 to BCn. The level shift circuit 22 provided for the battery cell BC1 receives the drive signal from the signal generation circuit 19 and transmits the drive signal to the adjacent level shift circuit 22 provided for the battery cell BC2 by level-shifting the drive signal while outputting the drive voltage to the transistor N2. In this way, since the drive signal propagates through all the level shift circuits 22 in sequence, all the transistors N2, P2 can be turned ON and OFF at once.

Second Embodiment

Figure 5A:
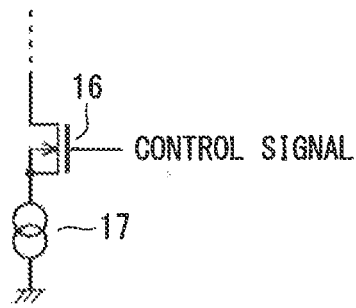
FIGS. 5A, 5B, 5C, 5D, 5E, and 5F are schematics of a switch circuit and a constant current circuit according to a second embodiment of the present disclosure.
Figure 5B:
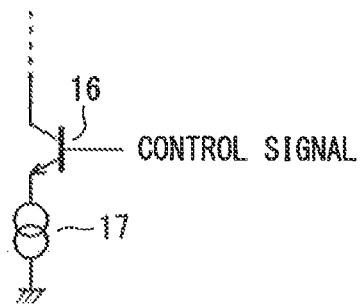
Figure 5C:
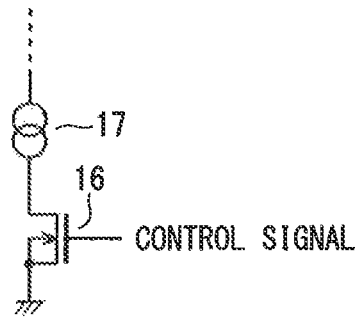
Figure 5D:
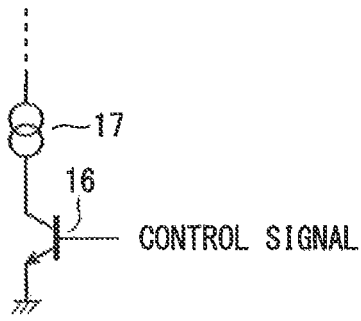
Figure 5E:
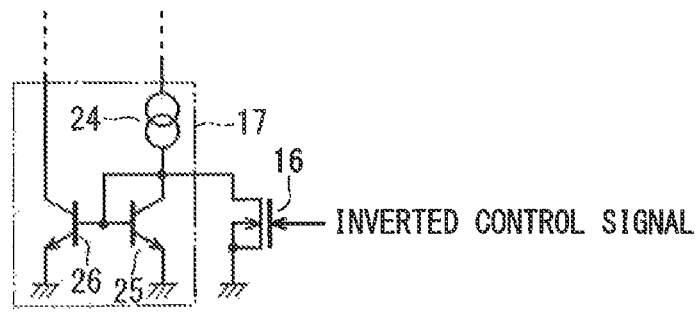
Figure 5F:
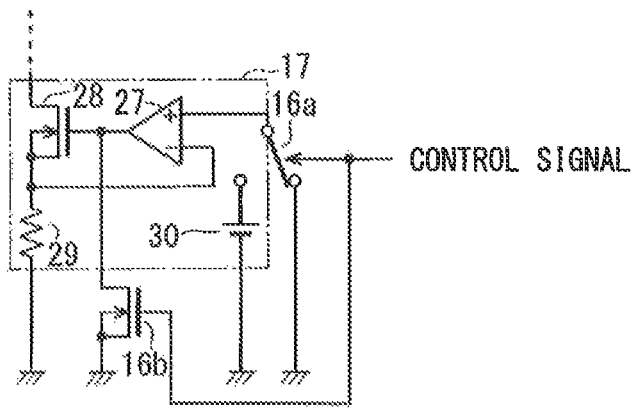

A second embodiment of the present disclosure is described below with reference to FIGS. 5A-5F. FIGS. 5A-5D show examples of the switch circuit 16, and FIGS. 5E and 5F show examples of the constant current circuit 17. In the example of FIG. 5A, an N-channel MOS transistor is used as the switch circuit 16. In the example of FIG. 5B, an NPN transistor is used as the switch circuit 16. In the example of FIG. 5C, although the N-channel MOS transistor is used as the switch circuit 16, the switch circuit 16 and the constant current circuit 17 are connected in the opposite order to that shown in FIG. 5A. In the example of FIG. 5D, although the NPN transistor is used as the switch circuit 16, the switch circuit 16 and the constant current circuit 17 are connected in the opposite order to that shown in FIG. 5B.

In the example shown in FIG. 5E, the constant current circuit 17 is configured so that an output current of a constant current source 24 can be turned by a current mirror circuit constructed with NPN transistors 25, 26. Alternatively, the transistors 25, 26 can be replaced with N-channel MOS transistors. The transistor 25 is connected in parallel to the switch circuit 16. In FIG. 5E, the switch circuit 16 is an N-channel MOS transistor, and an inverted signal of the current control signal is inputted to the gate of the MOS transistor.

In the example shown in FIG. 5F, the constant current circuit 17 includes an operational amplifier 27, an N-channel MOS transistor 28, a resistor 29, and a reference voltage circuit 30, and the switch circuit 16 includes a first switch 16a and a second switch 16b. The first switch 16a switches to the reference voltage circuit 30 side when the current control signal is at the ON level. In contrast, the first switch 16a switches to the ground potential side when the current control signal is at the OFF level. The second switch 16b is connected between an output terminal of the operational amplifier 27 and the ground potential. In FIG. 5F, the second switch 16b is an N-channel MOS transistor. When the current control signal is at the ON level, the constant current circuit 17 outputs a constant current calculated by dividing a reference voltage of the reference voltage circuit 30 by a resistance of the resistor 29. The second switch 16b is not essential and can be omitted as needed.

Third Embodiment

Figure 6:
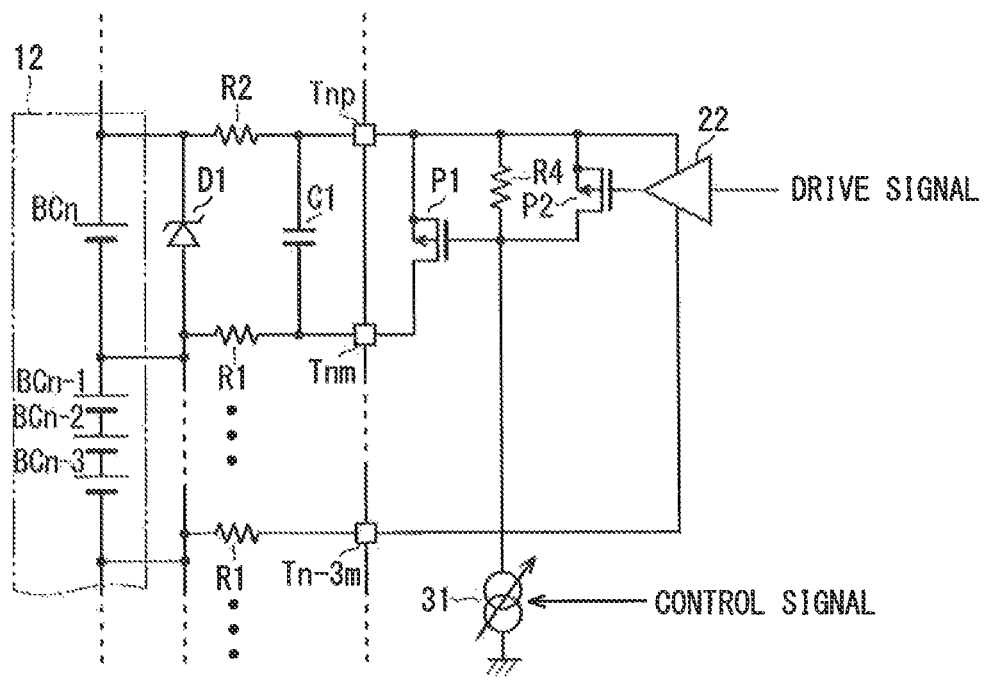
FIG. 6 is a schematic of a control circuit and its peripheral circuit according to a third embodiment of the present disclosure.

A third embodiment of the present disclosure is described below with reference to FIG. 6. According to the third embodiment, the control circuit 21 includes a variable constant current circuit 31 instead of the switch circuit 16 and the constant current circuit 17 shown in FIG. 1. The variable constant current circuit 31 outputs a first constant current I1 when the current control signal is at the ON level, and outputs a second constant current I2 when the current control signal is at the OFF level. The second constant current I2 is sufficiently smaller than the first constant current I1.

In this case, the following formulas (1) and (2) are satisfied.

$$I1 \times R4 \geq Vth \qquad (1)$$

$$I2 \times R4 < Vth \qquad (2)$$

That is, the IC 11 is in the equalization execution state when the current control signal is at the ON level in the equalization mode, and the IC 11 is in the equalization stop state when the current control signal is at the OFF level in the equalization mode.

The other configurations, effects, and advantages of the third embodiments are the same as those of the first embodiment.

Fourth Embodiment

Figure 7:
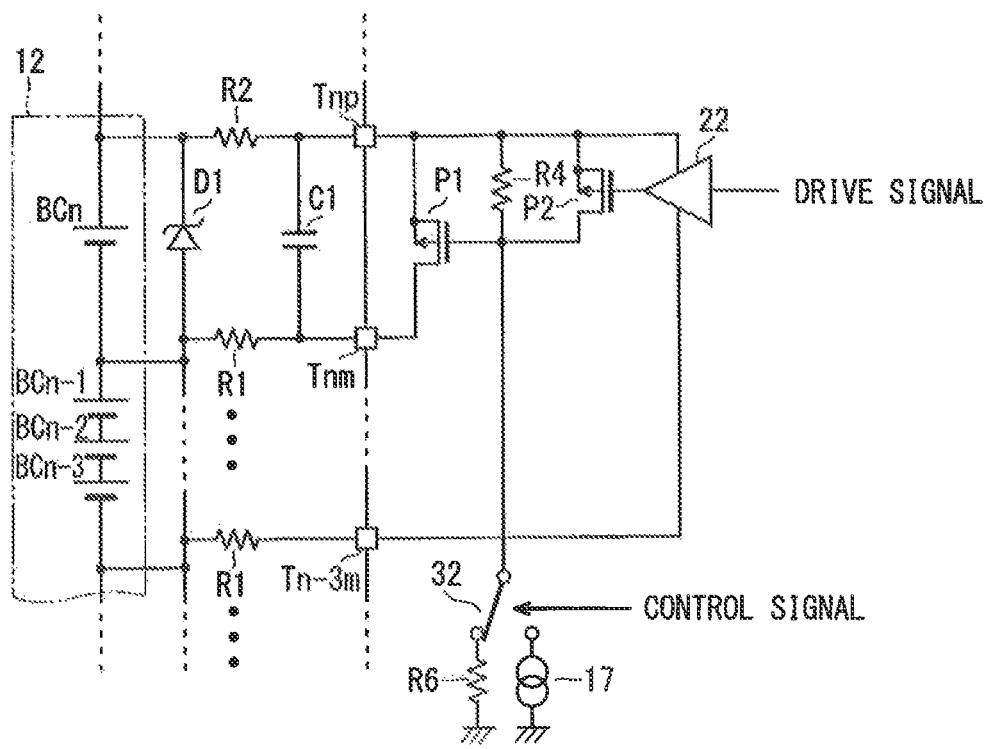
FIG. 7 is a schematic of a control circuit and its peripheral circuit according to a fourth embodiment of the present disclosure.

A fourth embodiment of the present disclosure is described below with reference to FIG. 7. According to the fourth embodiment, the control circuit 21 includes the constant current circuit 17, a resistor R6 as a resistance circuit, and a selection switch 32 instead of the switch 16. The selection switch 32 selects one of the constant current circuit 17 and the resistor R6 according to the current control signal and connects the selected one in series to the resistor R4. Specifically, the selection switch 32 selects the constant current circuit 17 when the current control signal is at the ON level, and selects the resistor R6 when the current control signal is at the OFF level.

When the output current of the constant current circuit 17 flows through the resistor R4, the gate-to-source voltage of the transistor N1, P1 increases to not less than its threshold voltage Vth, and the transistor N1, P1 is turned ON. A resistance of the resistor R6 is sufficiently larger than a resistance of the resistor R4. In this case, the following formula (3) is satisfied.

$$R4/(R4+R6) \times V(Tnp) < Vth \qquad (3)$$

In the formula (3), V(Tnp) represents a voltage of the terminal Tnp.

The other configurations, effects, and advantages of the fourth embodiments are the same as those of the first embodiment.

Fifth Embodiment

A fifth embodiment of the present disclosure is described below with reference to FIG. 6. According to the fifth embodiment, each of the battery cells BC1 to BCn/2 located on the low potential side is provided with a P-channel MOS transistor P1 as the equalization switch, and each of the battery cells BCn/2+1-BCn located on the high potential side is provided with an N-channel MOS transistor N1 as the equalization switch.

Figure 8:
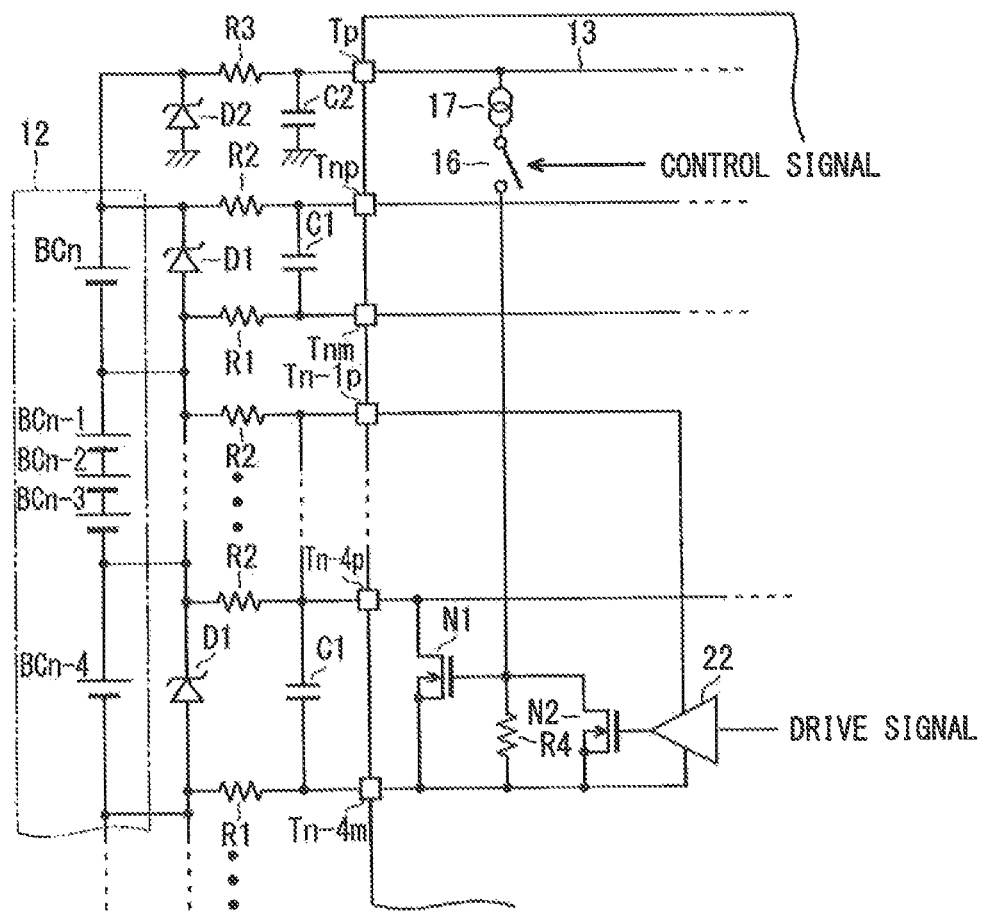
FIG. 8 is a schematic of a control circuit and its peripheral circuit according to a fifth embodiment of the present disclosure.

A series circuit of a switch circuit 16 and a constant current circuit 17 is connected between the gate of the transistor N1 and the power supply line 13. Although not shown in FIG. 8, the transistor P1 is also provided with a series circuit of the switch circuit 16 and the constant current circuit 17. Further, the transistor P1 is provided with a circuit for causing an output current of the constant current circuit 17 to turn at the ground and to flow through the resistor R4.

The resistor R4 is connected between a drain and a source of an N-channel MOS transistor N2 in addition to between the gate and the source of the transistor N1. Likewise, the resistor R4 is connected between a drain and a source of a P-channel MOS transistor P2 in addition to the gate and the source of the transistor P1. The other configurations, effects, and advantages of the fourth embodiments are the same as those of the first embodiment.

Modifications

While the present disclosure has been described with reference to embodiments thereof, it is to be understood that the disclosure is not limited to the embodiments. The present disclosure is intended to cover various modifications and equivalent arrangements within the spirit and scope of the present disclosure.

The batteries cells (e.g., the battery cells BC4 to BCn-3) arranged in the middle of the assembled battery 12 can be provided with either the N-channel MOS transistor N1 or the P-channel MOS transistor N1. The equalization switch can be a bipolar transistor instead of a MOS transistor.

In the embodiments, a reference potential to which the negative terminal of the battery cell BC 1 is connected is the ground potential. Alternatively, the reference potential can be other than ground potential. The transistor N2, P2 and the drive circuit 23 are not always necessary and can be omitted as needed. The power supply voltage on which the level shift circuit 22 provided for the battery cell BCi operates can be produced by a series circuit of adjacent two, three, or five battery cells including the battery cell BCi.

The drive circuit 23 is not limited to the level shift circuit 22, as long as the drive circuit 23 is configured so that the ON-drive voltage for driving the transistor N2, P2 can be outputted in accordance with the ON-drive signal. For example, the transistor N2, P2 can be driven in the same manner as the equalization switch N1, P1 by connecting a resistor between the gate and source of the transistor N2, P2 and by passing a current through the resistor using a series circuit of a switch circuit and a constant current circuit.

A time at which the vehicle system enters the equalization mode, a time at which the discharge starts in the equalization process, and a time at which the discharge ends in the equalization process are not limited to those shown in FIG. 3.

The signal generation circuit 19 can restrict the equalization execution state so that the cell voltage of the battery cell indicated by the equalization signal can be kept not less than the minimum effective voltage. For example, the signal generation circuit 19 can restrict the equalization execution state by stopping discharging the battery cell indicated by the equalization signal or reducing the discharging time indicated by the equalization signal.

What is claimed is:

1. An equalization device for equalizing cell voltages of a plurality of battery cells of an assembled battery, the number of the plurality of battery cells being n which is a positive integer, the plurality of battery cells being connected in series in such a manner that a first terminal of the k+1th battery cell is connected to a second terminal of the kth battery cell, where k is a positive integer less than n, the equalization device comprising:
   a plurality of equalization switches, each equalization switch being provided for a corresponding one of the plurality of battery cells, each equalization switch having energization terminals, a control terminal, and a threshold voltage, a current path between the energization terminals being interposed between the first terminal and the second terminal of the corresponding battery cell, the current path conducting when a control voltage not less than the threshold voltage is applied between the control terminal and one of the energization terminals;

a plurality of transistors, each transistor having energization terminals connected between the control terminal and the one of the energization terminals of the corresponding equalization switch to provide each of the plurality of transistors to correspond to one of the plurality of equalization switches;

a control circuit that includes a plurality of constant current circuits and a plurality of switch circuits and that switches an equalization execution state and an equalization stop state in accordance with an equalization signal provided for each battery cell, the plurality of constant current circuits and the plurality of switch circuits of the control circuit are connected in series with a control terminal of corresponding one of the plurality of equalization switches;

a drive circuit that outputs an ON-drive voltage;

and a plurality of resistors, each resistor being connected between the control terminal and the one of the energization terminals of a corresponding one of the plurality of equalization switches and being connected between the energization terminals of corresponding one of the plurality of transistors, one end of each of the plurality of resistors is connected with the control terminal of the corresponding one of the plurality of equalization switches, the switch circuit, and the constant current circuit, and the other end of each of the plurality of resistors is connected with the one energization terminal of the corresponding one of the plurality of equalization switches, wherein in the equalization execution state, the control circuit generates the control voltage not less than the threshold voltage by passing an electric current through the resistor provided for the battery cell corresponding to the equalization signal, in the equalization stop state, the control circuit causes the resistor provided for the battery cell corresponding to the equalization signal to generate the control voltage less than the threshold voltage, and when the ON-drive voltage is applied between a control terminal and one of the energization terminals of a first one of the plurality of transistors to turn ON the first one of the plurality of transistors, a voltage between the energization terminals of the first one of the plurality of transistors becomes less than the threshold voltage to turn OFF the corresponding equalization switch.

2. The equalization device according to claim 1, wherein the drive circuit outputs the ON-drive voltage to all the plurality of transistors at once in response to a single ON-drive signal.

3. The equalization device according to claim 2, wherein the drive circuit includes a plurality of level shift circuits, each level shift circuit is provided for a corresponding one of the plurality of battery cells and operates on a power supply voltage produced by a series circuit of adjacent battery cells including the corresponding battery cell, a first one of the plurality of level shift circuits outputs the ON-drive voltage by level-shifting the ON-drive signal, and each of the others of the plurality of level shift circuits receives the ON-drive voltage, as the ON-drive signal, from an adjacent level shift circuit.

4. The equalization device according to claim 1, wherein the control circuit includes a plurality of series circuits, each series circuit is provided for a corresponding one of the plurality of resistors and includes a constant current circuit and a switch circuit, the constant current circuit outputs a constant current which causes the corresponding resistor to generate the control voltage not less than the threshold voltage, and the switch circuit is turned ON and OFF in accordance with the equalization signal.

5. The equalization device according to claim 1, wherein the control circuit includes a plurality of variable constant current circuits, each variable constant current circuit is provided for a corresponding one of the plurality of resistors, the constant current circuit selectively outputs one of a first current and a second current in accordance with the equalization signal, the first current causes the corresponding resistor to generate the control voltage not less than the threshold voltage, and the second current causes the corresponding resistor to generate the control voltage less than the threshold voltage.

6. An equalization device for equalizing cell voltages of a plurality of battery cells of an assembled battery, the number of the plurality of battery cells being n which is a positive integer, the plurality of battery cells being connected in series in such a manner that a first terminal of the k+1th battery cell is connected to a second terminal of the kth battery cell, where k is a positive integer less than n, the equalization device comprising:

a plurality of equalization switches, each equalization switch being provided for a corresponding one of the plurality of battery cells, each equalization switch having energization terminals, a control terminal, and a threshold voltage, a current path between the energization terminals being interposed between the first terminal and the second terminal of the corresponding battery cell, the current path conducting when a control voltage not less than the threshold voltage is applied between the control terminal and one of the energization terminals;

a plurality of transistors, each transistor having energization terminals connected between the control terminal and the one of the energization terminals of the corresponding equalization switch to provide each of the plurality of transistors to correspond to one of the plurality of equalization switches;

a control circuit that includes a plurality of constant current circuits, a plurality of resistor circuits, and a plurality of selectors and that switches an equalization execution state and an equalization stop state in accordance with an equalization signal provided for each battery cell, the plurality of constant current circuits and the plurality of switch circuits are connected in series with a control terminal of corresponding one of the plurality of equalization switches; and a plurality of resistors, each resistor being connected between the control terminal and the one of the energization terminals of a corresponding one of the plurality of equalization switches, each of the plurality of resistors is connected between the energization terminals of corresponding one of the plurality of transistors, one end of each of the plurality of resistors is connected with the control terminal of the corresponding one of the plurality of equalization switches, the plurality of selectors, and the constant current circuit, and the other end of each of the plurality of resistors is connected with the one energization terminal of the corresponding one of the plurality of equalization switches, wherein in the equalization execution state, the control circuit generates the control voltage not less than the threshold voltage by passing an electric current through the resistor provided for the battery cell corresponding to the equalization signal, in the equalization stop state, the control circuit causes the resistor provided for the battery cell corresponding to the equalization signal to generate the control voltage less than the threshold voltage, each constant current circuit outputs a constant current which causes a corresponding resistor of the plurality of resistors connected to the plurality of equalization switches to generate the control voltage not less than the threshold voltage, each resistor circuit of the control circuit causes the corresponding resistor of the plurality of resistors connected to the plurality of equalization switches to generate the control voltage less than the threshold voltage when being connected to the corresponding resistor, and each selector selectively connects one of the corresponding constant current circuit and the corresponding resistor circuit of the control circuit in series to the corresponding resistor of the plurality of resistors connected to the plurality of equalization switches and disconnects the other of the corresponding constant current circuit and the corresponding resistor circuit from the corresponding resistor in accordance with the equalization signal.

7. The equalization device according to claim 1, wherein the control circuit restricts the equalization execution state so that the cell voltage of the battery cell corresponding to the equalization signal is kept not less than a predetermined minimum effective voltage.

8. The equalization device according to claim 1, wherein the equalization signal is generated so that the cell voltage of the battery cell corresponding to the equalization signal is kept not less than a predetermined minimum effective voltage.

9. The equalization device according to claim 1, wherein the plurality of equalization switches are different from the plurality of transistors, which are respectively connected to the plurality of equalization switches.

* * * * *